United States Patent
G De Quevedo-Dominguez

(10) Patent No.: US 8,973,772 B2
(45) Date of Patent: Mar. 10, 2015

(54) PLIABLE THERMAL CONTAINER

(71) Applicant: Eduardo G De Quevedo-Dominguez, Leon (MX)

(72) Inventor: Eduardo G De Quevedo-Dominguez, Leon (MX)

( * ) Notice: Subject to any disclaimer, the term of this patent is extended or adjusted under 35 U.S.C. 154(b) by 0 days.

(21) Appl. No.: 14/029,597

(22) Filed: Sep. 17, 2013

(65) Prior Publication Data

US 2014/0084009 A1    Mar. 27, 2014

(30) Foreign Application Priority Data

Sep. 17, 2012  (MX) .................... MX/a/2012/010717

(51) Int. Cl.
| | |
|---|---|
| *B65D 1/24* | (2006.01) |
| *B29C 44/14* | (2006.01) |
| *B65D 81/38* | (2006.01) |
| *B65D 43/02* | (2006.01) |
| *B65D 43/16* | (2006.01) |
| *B29C 44/56* | (2006.01) |

(52) U.S. Cl.
CPC ............... *B65D 1/24* (2013.01); *B65D 43/163* (2013.01); *B29C 44/14* (2013.01); *B29C 44/569* (2013.01); *B65D 81/3816* (2013.01); *B65D 43/022* (2013.01); *B65D 2543/00074* (2013.01); *B65D 2543/00296* (2013.01); *B65D 2543/00379* (2013.01); *B65D 2543/00509* (2013.01); *B65D 2543/00546* (2013.01)
USPC ..................... 220/324; 220/62.18; 220/62.22; 428/36.5

(58) Field of Classification Search
CPC ........ B65D 25/14; B65D 45/16; B65D 25/04; B32B 15/095; B32B 15/08; E05D 1/02; E05D 1/00
USPC ............... 220/324, 315, 62.18, 62.22, 62.13, 220/62.15, 826, 810, 524, 526, 523, 254.6, 220/254.3, 254.2, 254.1, DIG. 9, DIG. 11, 220/847, 837; 428/36.5, 35.7, 34.1; 16/225, 16/372, 226, 227, 385, DIG. 13
See application file for complete search history.

(56) References Cited

U.S. PATENT DOCUMENTS

| | | | | |
|---|---|---|---|---|
| 2,201,968 | A * | 5/1940 | Fischer | 16/372 |
| 2,464,069 | A * | 3/1949 | Benson | 206/466 |
| 3,445,052 | A * | 5/1969 | Lewallen | 428/158 |
| 4,196,817 | A * | 4/1980 | Moser | 215/12.1 |
| 4,537,313 | A * | 8/1985 | Workman | 206/545 |
| 2005/0281972 | A1* | 12/2005 | Purgert et al. | 428/36.5 |
| 2014/0304946 | A1* | 10/2014 | Svatos et al. | 16/225 |

* cited by examiner

*Primary Examiner* — Robert J Hicks
(74) *Attorney, Agent, or Firm* — James P. Muraff; Neal, Gerber & Eisenberg LLP

(57) ABSTRACT

Pliable thermal containers interchangeably serve for containing cold or hot items, and are manufactured in polyurethane or EVA foamed materials, are struck resistant, and maintain a structure that allows them to remain upright and resist certain loads. The containers solve durability issues, A foamed material is used, and comprises unicellular air bubbles that provide thermal isolation properties and at the same time, during molding, this material attaches to a plasticized textile inner coating located at a mold piston for forming an interference zone. The lid may be directly hinged to the cavity using a textile hinge submerged in the material or independent thereof, with the lid being capable of being locked with embedded fasteners. with The pliable thermal containers solve brittleness problems of current containers shaped monolithic containers, are also provided.

9 Claims, 5 Drawing Sheets

FIGURE 4
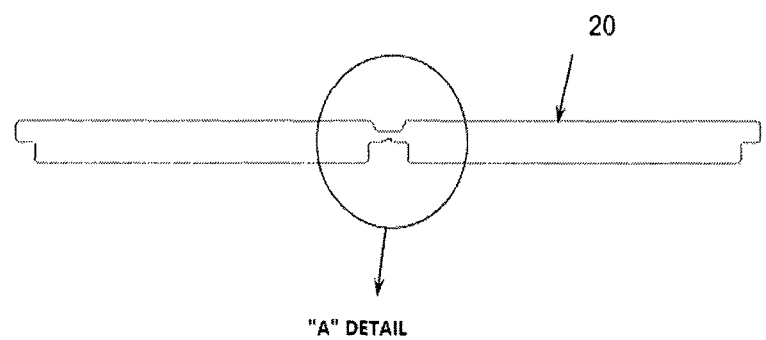
"A" DETAIL
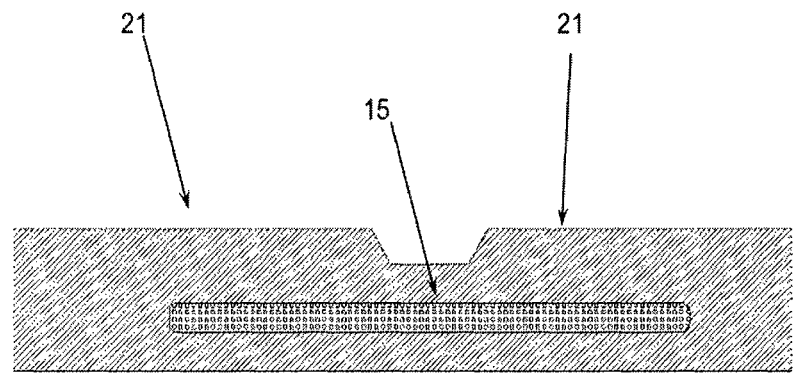
FIGURE 5

US 8,973,772 B2

PLIABLE THERMAL CONTAINER

CROSS-REFERENCE TO RELATED PATENT APPLICATION

This application claims the benefit of Mexican Patent Application No. MX/a/2012/010717, filed on Sep. 17, 2012 entitled "Pliable Thermal Container," the disclosure of which is incorporated herein in its entirety by reference.

TECHNICAL FIELD OF THE INVENTION

This invention refers to a container, specifically to a container for maintaining the temperature of its contents.

OBJECTS OF THE INVENTION

The object of this invention is to have a thermal container structure with enough pliability so as to absorb struck and maintain its geometry and staunchness, such that the products contained therein remain isolated from the surrounding environment even when the container carrying same has undergone any struck, and thus increasing the container service shelf life.

BACKGROUNDS

There are equipments for the thermal containers structures such as those known from the document U.S. Pat. No. 4,196,817, granted to Moser D. Wescott, dated Apr. 8, 1980, consisting of a layered pliable couplings bag for creating a thermal environment wherein a container is housed, wherein ice may be provided there between, in such a way that when pushing the bag, the liquid contained therein may be expelled through a straw provided therein.

Other examples of these kind of pliable thermal containers are known from the documents: U.S. Pat. No. 4,537,313 granted to Eleanor Workman, dated Aug. 27, 1985; document U.S. Pat. No. 2,464,069 of R. G. Benson on Mar. 8, 1949.

TECHNICAL PROBLEM TO BE SOLVED

Even though there are pliable thermal containers that are known for maintaining the temperature of the items contained therein, the solution to the problem of having a container structure that is produced of a sole isolating layer or also called monolithic is not envisioned, as the known inventions demand the use of several overlaid layers of pliable couplings for leveraging their physical features such as waterproofing, thermal isolation and friction resistance for embedding a resistant and pliable thermal container, which demands a series of operations in its construction and in the particular development of each of the couplings for arranging the pliable thermal container.

BRIEF DESCRIPTION OF THE INVENTION

In order to solve the problem of using several overlaid layers of pliable couplings for leveraging their physical features that each one of them separately have when creating monolithic pliable thermal container, monolithic pliable thermal container structure has been developed, this means, made of one single piece, wherein the body that forms same is one single structure with the necessary thermal capacity and strength and that, further, is waterproof. Said structure comprises a base with side walls of an appropriate geometry to the product desired to be housed therein with a lid of the same material of polyurethane foam or EVA, wherein there is an inner surface, a middle layer and an outer surface, wherein the middle layer comprises a mixture of material comprising a body with unicellular air bubbles and at the same time, this same material produces the outer surface that is exposed. The middle layer forms an interference portion with the inner surface that fastens the components of the structure.

BRIEF DESCRIPTION OF THE DRAWINGS

FIG. 4 shows a schematic view of a lid for a pliable thermal container according to this invention;

FIG. 5 shows a schematic view of the "A" DETAIL shown in FIG. 4 of a lid for a pliable thermal container according to this invention;

DETAILED DESCRIPTION OF THE INVENTION

Figure 1:
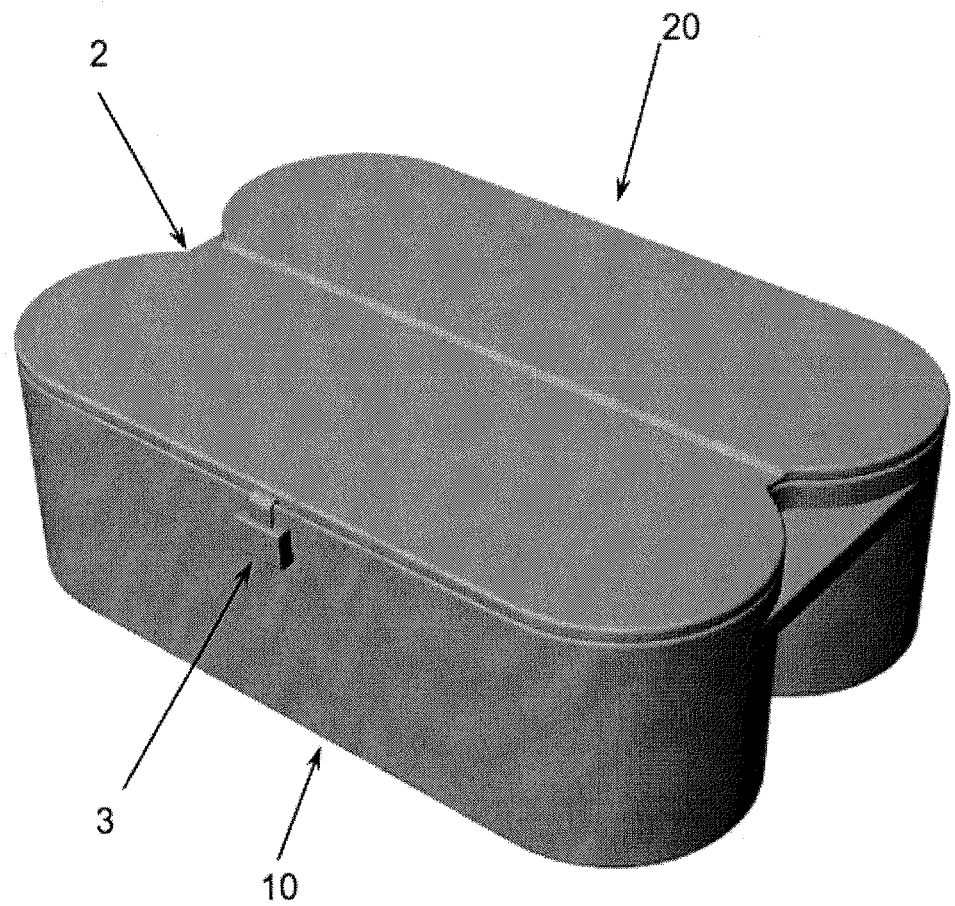
FIG. 1 shows a perspective view of the pliable thermal container.
Figure 6:
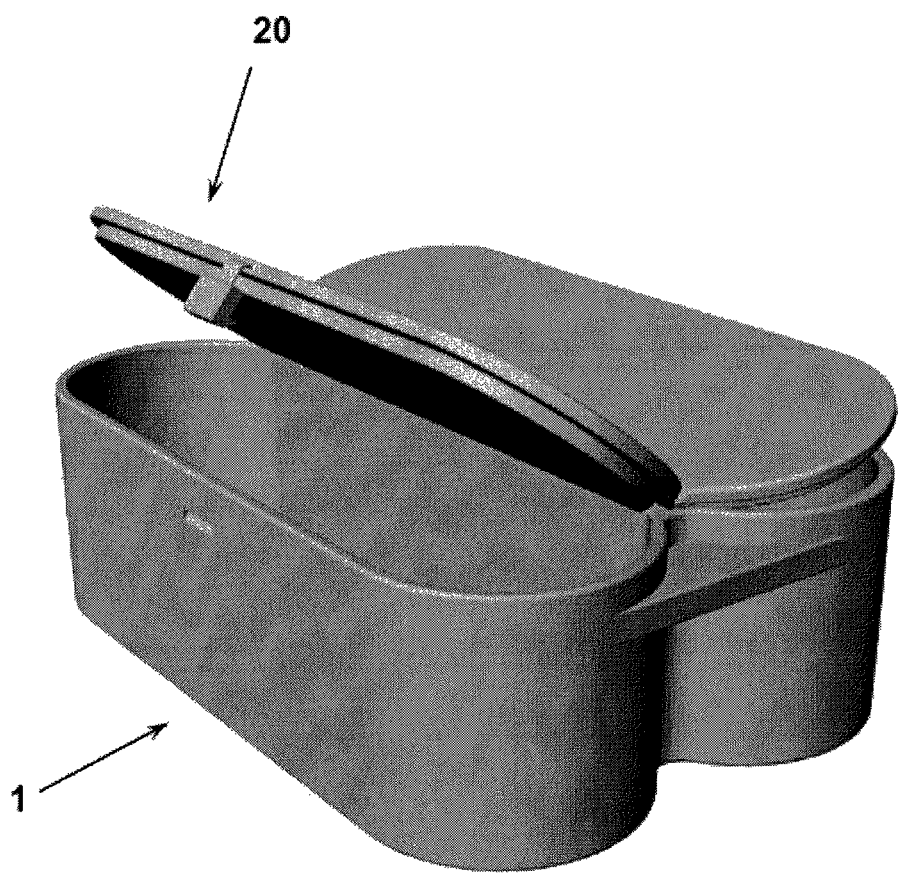
FIG. 6 shows a perspective view of a pliable thermal container with its lid formed in a monolithic manner.

The present invention consists of a pliable thermal container comprising a monolithic body (1) as the one shown in FIG. 1 and FIG. 6, arranged into a vessel (10) and optionally a lid (20) as shown in FIG. 1, in such a manner that a hinge member (2) and fastening means (3) may be provided for locking the closure between the vessel (10) and the lid (20).

Figure 2:
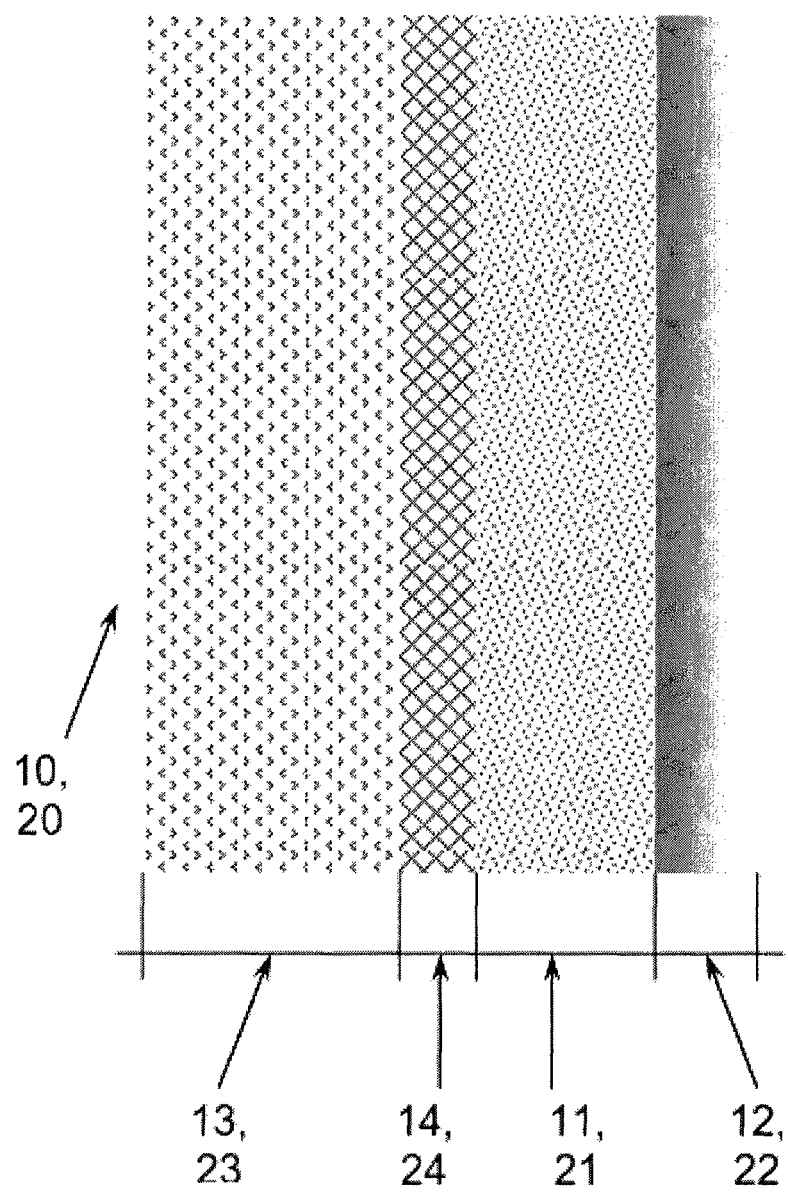
FIG. 2 shows a schematic view of a cross sectional portion of the pliable thermal container wall according to this invention.

The vessel (10) walls are comprised by a body such as the one shown in FIG. 2, comprising the results of a mixture of materials comprising a structure resulting from a mixture of materials comprising unicellular air bubbles such as polyurethane or EVA, wherein there is a middle layer (11) with an outer surface (12). The vessel (10) is coated in its inner face by an inner coating (13) in the inner face of the vessel (10) which may be of a food usage textile material, such that there is provided an inner coating. The fastening of the inner coating (13) is made by an interference area (14), such that there is a single piece body. The mixture of materials comprising the body with unicellular air bubbles, turn the vessel (10) into capable of containing the temperature transference, both from the outside into the inside and vice versa, besides being capable of resuming its geometry after being stroked and at the same time retaining liquids therein.

Figure 3:
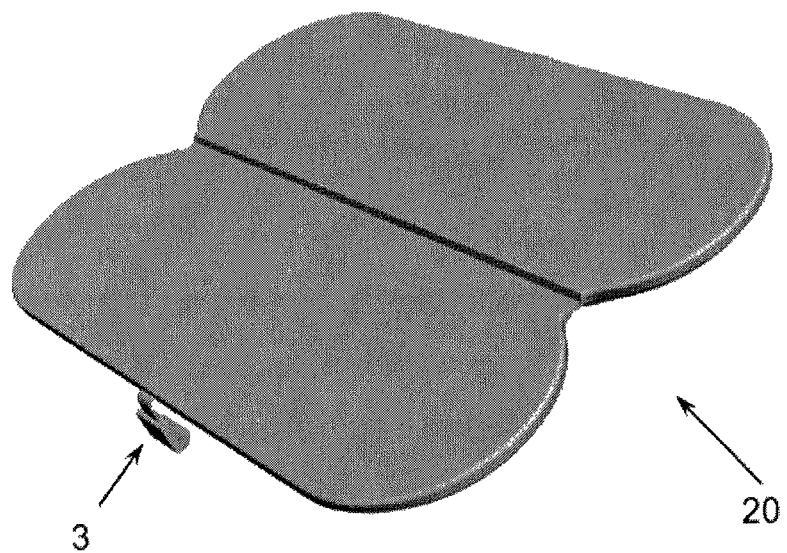
FIG. 3 shows a perspective exploded view of a pliable thermal container according to this invention.
Figure 3:
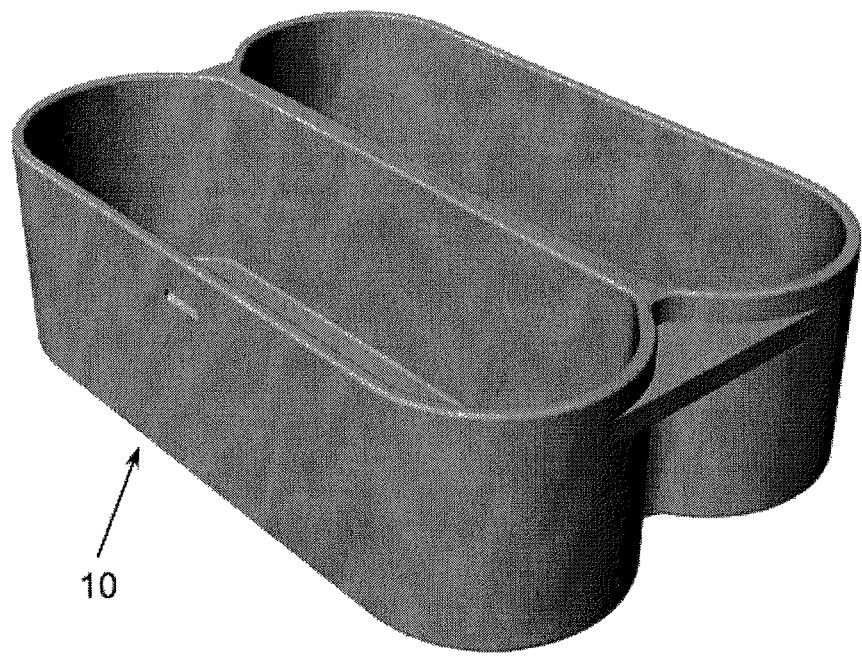

Optionally, there is a lid (20) as shown in FIG. 3, which shares the structure of the vessel (10) as shown in FIG. 2, this means: it has a body of a mixture of materials with unicellular air bubbles such as polyurethane or EVA, wherein there is a middle layer (21) with an outer surface (22). The lid (20) is coated in its inner face by an inner coating (23) in the inner face of the lid (20) which may be of a food usage textile material, such that there is provided an inner coating. The fastening of the inner coating (23) is made by an interference area (24), such that there is a single piece body. The mixture of materials comprising the body with unicellular air bubbles, turn the lid (20) into capable of containing the temperature transference, both from the outside into the inside and vice versa, besides being capable of resuming its geometry after being stroked and at same time retain liquids therein.

There may be provided a hinge member (2), having a hinge core (15) of textile material, submerged within the lid middle layer (21) as show in FIG. 4 and FIG. 5, such that the hinge core (15) provides pliability to the pliable zone of the hinge (2).

The lid (20) may be removable by means of fasteners (3) for locking the closure between the vessel (10) and the lid (20) as shown in FIG. 3.

For producing the pliable thermal container of this invention, there must be provided an inner coating (23) which may be of a plasticized food usage textile material of an appropriate geometry to the geometry of the container to be formed. Once the inner coating (13) is provided, it is mounted into a molding piston (not shown) which is sized for allowing the appropriate spacing between the inner coating (13) and the inner face of an injection mould (not shown), wherein this spacing is the one required for producing the vessel (10) thickness. Once the inner coating (13) is mounted in the mould piston, it is inserted into the molding chamber and then the mould assembly is tightly sealed, so that the mixture of materials comprising a body with unicellular air bubbles such as polyurethane or EVA is adhered to the inner coating (13) surface, such that the foamed material is attached to the inner coating (13), thereby providing structural stability to the thermal container. Likewise, in the case in which the lid (20) is embedded in the container (10), the hinge core (15) is provided at the appropriate mold area in order to be submerged in the middle layer (11, 21), between the container (10) and the lid (20).

The invention claimed is:

1. A pliable thermal container, comprising a monolithic vessel, a lid and a fastening means, wherein the vessel, lid, and fastening means are comprised of a material resulting from a mixture of materials with unicellular air bubbles,
wherein the lid comprises a middle layer, an outer surface, an inner coating, an interference area between the middle layer and the inner coating that provides structural stability to the thermal container; and a hinge member, with a hinge core of textile material, submerged within the middle layer.

2. A pliable thermal container according to claim 1, wherein the mixture of materials with unicellular air bubbles is polyurethane or EVA.

3. A pliable thermal container according to claim 1, wherein the inner coating is of a plasticized food usage textile material.

4. A pliable thermal container according to claim 1, wherein the lid shares the structure of the vessel.

5. A pliable thermal container according to claim 1, wherein the lid is removable by the fastening means.

6. A method for producing the pliable thermal container according to claim 1, comprising the steps of:
   a) producing the inner coating;
   b) mounting the inner coating in a molding piston;
   c) allowing a required spacing for the vessel (10) thickness between the inner coating and an inner face of an injection mould;
   d) inserting the piston in a molding chamber;
   e) tightly sealing a mould assembly; and
   f) adhering to the inner coating surface the mixture of materials comprising a body with unicellular air bubbles, such that the foamed material is attached to the inner coating.

7. A method for producing the container according to claim 6, wherein the inner coating is of a plasticized food usage textile material and of an appropriate geometry to the geometry of the container to be formed.

8. A method for producing the container according to claim 6, wherein the mixture of materials comprises a body with unicellular air bubbles made of polyurethane or EVA.

9. A method for producing the container according to claim 6, wherein in the case in which the lid is embedded in the container, the hinge core is provided at the appropriate mold area in order to be submerged in the middle layer, between the container and the lid.

* * * * *